United States Patent
Vijaya Kumar et al.

(10) Patent No.: US 12,525,126 B2
(45) Date of Patent: Jan. 13, 2026

(54) SYSTEM AND METHOD FOR CROWDSOURCED DETECTION OF DYNAMIC ROAD FEATURES

(71) Applicant: GM Global Technology Operations LLC, Detroit, MI (US)

(72) Inventors: Vivek Vijaya Kumar, Shelby Township, MI (US); Bo Yu, Troy, MI (US); Carolyn Heather MacLeod, Thornhill (CA); Carl P. Darukhanavala, Royal Oak, MI (US); Joon Hwang, Pflugerville, TX (US); Donald K. Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 18/522,464

(22) Filed: Nov. 29, 2023

(65) Prior Publication Data

US 2025/0174121 A1    May 29, 2025

(51) Int. Cl.
G08G 1/0962    (2006.01)
G01C 21/28     (2006.01)
G08G 1/0967    (2006.01)

(52) U.S. Cl.
CPC ....... G08G 1/096725 (2013.01); G01C 21/28 (2013.01); G08G 1/09623 (2013.01); G08G 1/096783 (2013.01)

(58) Field of Classification Search
CPC ......... G08G 1/096725; G08G 1/09623; G08G 1/096783; G01C 21/28

USPC .......................................................... 701/117
See application file for complete search history.

(56) References Cited

U.S. PATENT DOCUMENTS

| | | | |
|---|---|---|---|
| 10,929,696 B2 * | 2/2021 | Zaba | G06F 16/29 |
| 2015/0226562 A1 * | 8/2015 | Denaro | G06F 16/9537 701/409 |
| 2018/0304897 A1 * | 10/2018 | Kim | B60W 10/18 |
| 2020/0050973 A1 * | 2/2020 | Stenneth | G01C 21/3815 |
| 2020/0180692 A1 * | 6/2020 | Hara | G06F 16/9537 |
| 2020/0184812 A1 * | 6/2020 | Han | G06V 20/20 |
| 2020/0245115 A1 * | 7/2020 | Dorrance | G08G 1/0141 |
| 2020/0324786 A1 * | 10/2020 | Gray | B60W 60/0059 |
| 2020/0327804 A1 * | 10/2020 | Xu | G08G 1/095 |
| 2020/0394426 A1 * | 12/2020 | Ro | G05D 1/0094 |
| 2022/0215603 A1 * | 7/2022 | Goldman | B60W 30/18009 |
| 2022/0289187 A1 * | 9/2022 | Wilson | B60K 35/10 |
| 2023/0140079 A1 * | 5/2023 | Zhu | G06V 20/58 382/103 |
| 2023/0360524 A1 * | 11/2023 | Karakayis | B60W 30/146 |

* cited by examiner

*Primary Examiner* — B M M Hannan
(74) *Attorney, Agent, or Firm* — Vivacqua Crane, PLLC

(57) ABSTRACT

A method for crowdsourced detection of a dynamic road feature includes detecting the dynamic road feature using a sensor of a vehicle and communicating with a dynamic road feature database of a remote server. Further, the method includes uploading a feature data to the dynamic road feature database of the remote server in response to detecting the dynamic road feature. The feature data includes information about the road dynamic feature previously detected by the sensor of the vehicle. Also, the method further includes controlling the movement of the vehicle using the feature data.

20 Claims, 2 Drawing Sheets

SYSTEM AND METHOD FOR CROWDSOURCED DETECTION OF DYNAMIC ROAD FEATURES

INTRODUCTION

The present disclosure relates to a system and method for crowdsourced detection of dynamic road features.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Traditionally, most of the road features (e.g., speed limit signs, lane lines, etc.) have been static. However, nowadays, some road features are dynamic (i.e., dynamic road feature). For example, the contents of some speed limit signs now change depending on the time of the day. As another example, the lane directions of some lanes change direction depending on the time of the day. Speed limits may also change depending on the time of the day. It is therefore desirable to develop a method and system for detecting dynamic road features via crowdsourcing.

SUMMARY

The present disclosure describes a method for crowdsourced detection of a dynamic road feature. The method includes detecting the dynamic road feature using a sensor of a vehicle and communicating with a dynamic road feature database of a remote server. Further, the method includes uploading a feature data to the dynamic road feature database of the remote server in response to detecting the dynamic road feature. The feature data includes information about the road dynamic feature previously detected by the sensor of the vehicle. Also, the method further includes controlling the movement of the vehicle using the feature data. The method described in this paragraph improves vehicle technology by correcting detecting dynamic road features using crowdsourcing, thereby control of the vehicle movement by taking changes in the dynamics road features.

In some aspects of the present disclosure, the method may include determining whether the dynamic road feature database already includes data about an existence of the dynamic road feature previously detected by the sensor of the vehicle and, in response to determining that the dynamic road feature database does not include the data about the existence of the dynamic road feature previously detected by the sensor of the vehicle, designating the dynamic road feature previously detected by the sensor of the vehicle as a new feature in the dynamic road feature database. The feature data includes information about a type of the dynamic road feature. The sensor of the vehicle generates sensor data. The method may further include determining a type of the dynamic road feature using the sensor data, determining whether there is agreement between the feature data in the dynamic road feature database and the sensor data about the type of the dynamic road feature in response to determining that the determining that the dynamic road feature database already includes the data about the existence of the dynamic road feature previously detected by the sensor of the vehicle. The method may further include reporting a disagreement about the type of the dynamic road feature between the sensor data and the feature data to the dynamic road feature database in response to determining that there is no agreement between the feature data in the dynamic road feature database and the sensor data about the type of the dynamic road feature. The method may include determining a content of the dynamic road feature using the sensor data and determining whether there is agreement between the feature data in the dynamic road feature database and the sensor data about the content of the dynamic road feature in response to determining that the determining that the dynamic road feature database already includes the data about the existence of the dynamic road feature previously detected by the sensor of the vehicle. The method may further includes reporting a disagreement about the content of the dynamic road feature between the sensor data and the feature data to the dynamic road feature database in response to determining that there is no agreement between the feature data in the dynamic road feature database and the sensor data about the content of the dynamic road feature. The method may include identifying a start point and an end point of the dynamic road feature. The method may further include determining a temporal schedule of the dynamic road feature. The temporal schedule is indicative of a changes in the dynamic road feature with respect to time. The dynamic road feature may be, for example, a traffic sign (e.g., a variable speed limit sign) or a reversible lane that changes the traffic direction.

The present disclosure further describes a system for crowdsourced detection of dynamic road features. The system includes a sensor and a controller in communication with the sensor. The controller is programmed to execute the method described above.

The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
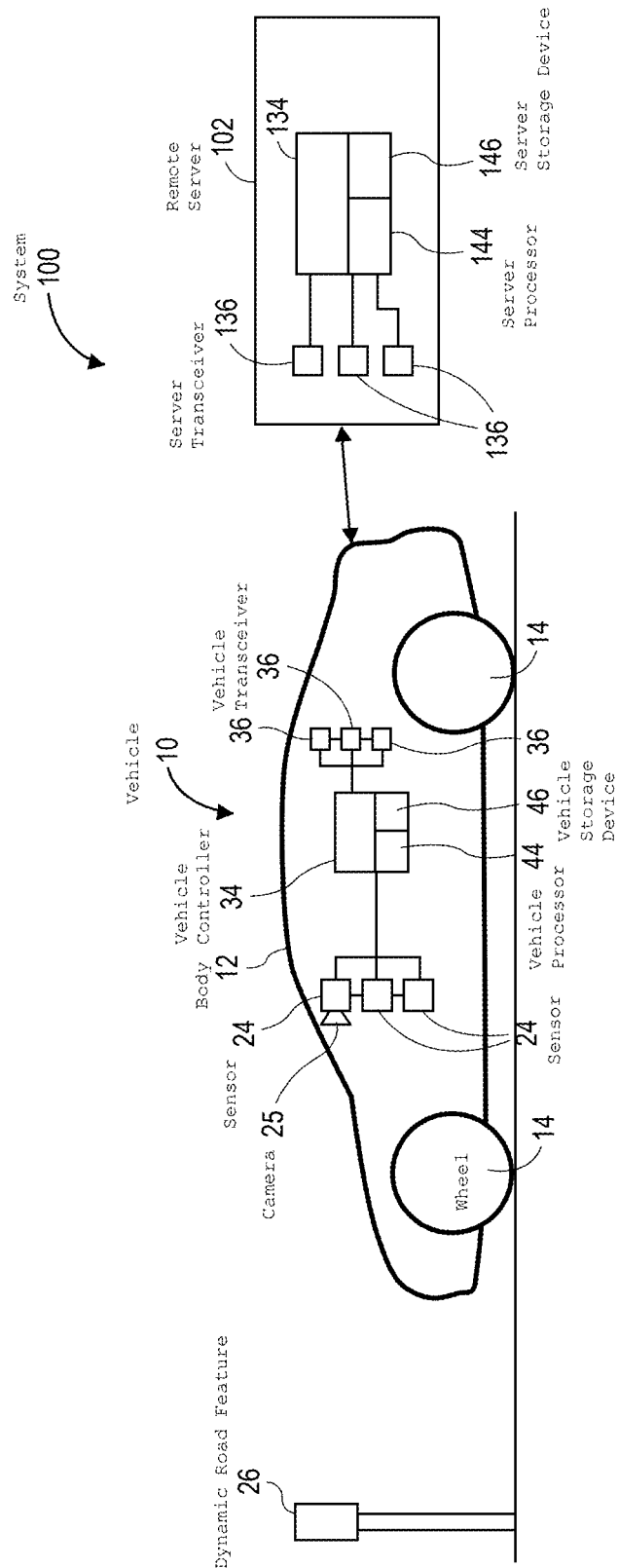
FIG. 1 is a schematic diagram of a system for crowdsourced detection of dynamic road features.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a body 12 and a plurality of wheels 14 coupled to the body 12. The vehicle 10 may be an autonomous vehicle. In the depicted embodiment, the vehicle 10 is depicted in the illustrated embodiment as a sedan, but it should be appreciated that other vehicles including trucks, coupes, sport utility vehicles (SUVs), recreational vehicles (RVs), etc., may also be used.

The vehicle 10 further includes one or more sensors 24 coupled to the body 12. The sensors 24 sense observable conditions of the exterior environment and/or the interior environment of the vehicle 10. As non-limiting examples, the sensors 24 may include one or more cameras, one or more light detection and ranging (LIDAR) sensors, one or more proximity sensors, one or more cameras, one or more ultrasonic sensors, one or more thermal imaging sensors, and/or other sensors. Each sensor 24 is configured to generate a signal that is indicative of the sensed observable conditions (i.e., sensor data) of the exterior environment and/or the interior environment of the vehicle 10. At least one of the sensors 24 is a front-facing camera 25 having a field of view large enough to capture one or more images of a dynamic road feature 26 in front of the vehicle 10.

Road features include anything physically related to the road. As non-limiting examples, road feature include lanes, sidewalks (pavement), roadways (carriageways), medians, lane lines, speed limit signs, shoulders, verges, bike paths (cycle paths), and shared-use paths. A dynamic road feature 26 is a road feature that changes depending on the time of the day. As a non-limiting examples, dynamic road features 26 may include variable speed limit signs that change depending on the time of the day and lanes which direction change depending on the time of the day.

The vehicle 10 includes a vehicle controller 34 in communication with the sensors 24. The vehicle controller 34 includes at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10. The vehicle controller 34 of the vehicle 10 may be programmed to execute the method 200 (FIG. 2) as described in detail below.

The instructions may include one or more separate programs, each of which comprises an ordered listing of executable instructions for implementing logical functions. The instructions, when executed by the vehicle processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms. Although a single vehicle controller 34 is shown in FIG. 1, embodiments of the vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the vehicle 10. The vehicle controller 34 is part of a system 100 for crowdsourced detection of dynamic road features.

The vehicle 10 further includes one or more vehicle transceivers 36 in communication with the vehicle controller 34. Each of the vehicle transceivers 36 is configured to wirelessly communicate information to and from other entities, such as a remote server 102 using, for example, Vehicle-to-everything (V2X) technology. As non-limiting examples, the vehicle transceivers 36 may transmit and/or receive information from other vehicles ("V2V" communication), infrastructure ("V2I" communication), remote systems at a remote call center (e.g., ON-STAR by GENERAL MOTORS) and/or personal electronic devices, such as a mobile phone. In certain embodiments, the vehicle transceivers 36 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle 10 is part of a system 100 for crowdsourced detection of dynamic road features. In addition to the vehicle 10, the system 100 may include the remote server 102 (e.g., cloud server), which physically separated and spaced apart from the vehicle 10.

The remote server 102 is in wireless communication with the vehicle 10. To do so, the remote server 102 includes a one or more server transceivers 136. Each of the server transceivers 136 is in communication with the server controller 134. Each of the vehicle transceivers 36 is configured to wirelessly communicate information to and from other entities, such as the vehicle 10 using, for example, Vehicle-to-everything (V2X) technology. As non-limiting examples, the vehicle transceivers 36 may transmit and/or receive information from other vehicles ("V2V" communication), infrastructure ("V2I" communication), and/or personal electronic devices, such as a mobile phone. In certain embodiments, the server transceivers 36 may be configured to communicate via a wireless local area network (WLAN) using IEEE 802.11 standards or by using cellular data communication.

The remote server 102 includes a server controller 134 in communication with the server transceivers 136. The server controller 134 includes at least one server processor 144 and a server non-transitory computer readable storage device or media 146. The server processor 144 may be a custom made or commercially available processor, a central processing unit (CPU), a graphics processing unit (GPU), an auxiliary processor among several processors associated with the server controller 134, a semiconductor-based microprocessor (in the form of a microchip or chip set), a macroprocessor, a combination thereof, or generally a device for executing instructions. The server computer readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the server processor 144 is powered down. The server computer-readable storage device or media 146 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the server controller 134 in controlling the vehicle 10. The server controller 134 may be programmed to execute the method 300 (FIG. 3) as described in detail below.

Figures 2, 3:
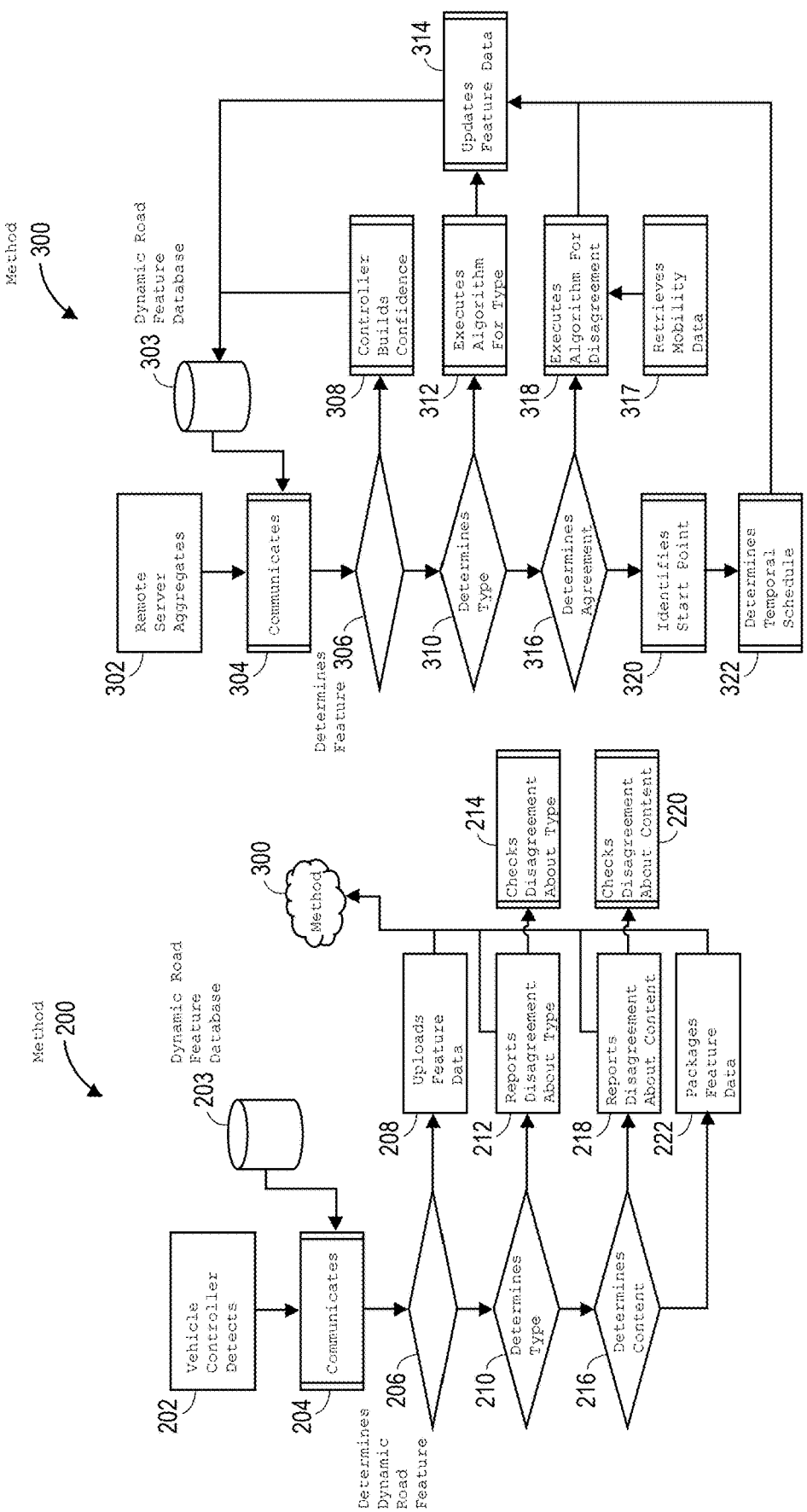
FIG. 2 is a method for in-vehicle crowdsourced detection of dynamic road features.
FIG. 3 is a method for crowdsourcing data about dynamic road features.

FIG. 2 is a flowchart of a method 200 for in-vehicle crowdsourced detection of dynamic road features. The method 200 may be performed by multiple vehicles 10 and begins at block 202. At block 202, the vehicle controller 34 detects one or more dynamic road features 26 using the sensor data generated by one or more sensors 24, such as the front-facing camera 25. Then, the method 200 continues to block 204.

At block 204, the vehicle controller 34 communicates with the dynamic road feature database 203 of the vehicle 10 to check whether there is agreement between the dynamic road feature 26 (e.g., variable speed limit sign) detected via the sensor 24 of the vehicle 10 and the information in the dynamic road feature database 203. Accordingly, at block 202, the vehicle controller 34 retrieves the data from the dynamic road feature database 203 that pertains to the dynamic road feature 26 detected via the sensor 24 of the vehicle 10. Next, the method 200 proceeds to block 206.

At block 206, the vehicle controller 34 determines whether the dynamic road feature database 203 already includes data about the existence of the dynamic road feature 26 previously detected by the sensor 24 (e.g., front-facing camera 25) of the vehicle 10 or by other method (such as third-party map provider). If the dynamic road feature database 203 does not include the data about the existence of the dynamic road feature 26 previously detected by the sensor 24 of the vehicle 10, the method 200 proceeds to block 208. At block 208, the vehicle controller 34 uploads feature data pertaining to the dynamic road feature 26 detected by the sensor 24 of the vehicle 10 to the remote server 102. The feature data includes information about the existence, location, type, and/or content of the dynamic road feature 26. Further, the vehicle controller 34 designates the dynamic road feature 26 previously detected by the sensor 24 of the vehicle 10 as a new feature in the dynamic road feature database 203. Then, the method 200 continues to the method 300 as described in detail below.

At block 206, if the dynamic road feature database 203 includes the data about the existence of the dynamic road feature 26 previously detected by the sensor 24 of the vehicle 10 or by other method (such as third-party map provider), the method 200 proceeds to block 210.

At block 210, the vehicle controller 34 determines the type of the dynamic road feature 26 using the sensor data. For example, the vehicle controller 34 may determine whether the road feature is truly a dynamic (e.g., changes over time) or static road feature. A static road feature does not change over time. Further, at block 210, the vehicle controller 34 determines whether there is agreement between the feature data in the dynamic road feature database 203 and the sensor data about the type of the dynamic road feature 26. If the vehicle controller 34 determines that there is no agreement about the type of the dynamic road feature 26 between the feature data in the dynamic road feature database 203 and the sensor data, then the method 200 proceeds to block 212.

At block 212, the vehicle controller 34 reports the disagreement about the type of the dynamic road feature between the sensor data and the feature data to the remote server 102. The method 200 then proceeds to block 214 and the method 300.

At block 214, the vehicle controller 34 checks how the Advanced Driver Assistance System (ADAS) of the vehicle 10 are affected by the disagreement about the type of the dynamic road feature between the sensor data and the feature data to the dynamic road feature database 203. Then, the vehicle controller 34 controls the movement of the vehicle 10 using the ADAS, the feature data reported to the remote server 102 and/or the sensor data.

If the vehicle controller 34 determines (at block 210) that there is agreement about the type of the dynamic road feature 26 between the feature data in the dynamic road feature database 203 and the sensor data, then the method 200 proceeds to block 216.

At block 216, the vehicle controller 34 determines the content of the dynamic road 26 using the sensor data collected by the sensors 24 of the vehicle 10. For example, the vehicle controller 34 may determine what is the speed limit of a variable speed limit sign using the sensor data. Further, at block 216, the vehicle controller 34 determines whether there is agreement about the content of the dynamic road feature 26 between the feature data in the dynamic road feature database 203 and the sensor data. If there is disagreement about the content of the dynamic road feature 26 between the feature data in the dynamic road feature database 203 and the sensor data, then the method 200 continues to block 218.

At block 218, the vehicle controller 34 reports the disagreement about the content of the dynamic road feature 26 between the feature data in the dynamic road feature database 203 and the sensor data to the remote server 102. Then, the method 200 continues to block 220.

At block 220, the vehicle controller 34 checks how the Advanced Driver Assistance System (ADAS) of the vehicle 10 are affected by the disagreement about the content of the dynamic road feature between the sensor data and the feature data to the dynamic road feature database 203. Then, the vehicle controller 34 controls the movement of the vehicle 10 using the ADAS, the feature data reported to the remote server 102 and/or the sensor data. When there is a disagreement about the speed limit of the dynamic road feature 26 (e.g., variable speed limit sign) between the sensor data and the feature data to the dynamic road feature database 203, the following ADAS control actions may be performed, namely: gather driver/user feedback; select lower speed; adjust speed according to the lead vehicle; and in case of larger disagreement values, disable the ADAS feature and give manual control back to the driver/user. When there is a disagreement about the lane information of the dynamic road feature 26 between the sensor data and the feature data to the dynamic road feature database 203, the ADAS feature is disabled, and manual control is given back to the driver/user.

If the vehicle controller 34 determines (at block 216) that there is agreement about the content of the dynamic road feature 26 between the feature data in the dynamic road feature database 203 and the sensor data, then the method 200 continues to block 222. At block 222, the vehicle controller 34 packages the feature data and the sensor data about the dynamic road feature 26 and then uploads the data packet (including the feature data and the sensor data) to a dynamic road feature database 303 (FIG. 3) of the remote server 102.

FIG. 3 is a method 300 for crowdsourcing data about dynamic road features 26. The method 300 begins at block 302. At block 302, the remote server 102 aggregates feature data about one or more dynamic road features 26 from one or more vehicles 10. As a non-limiting example, the remote server 102 crowdsources feature data about multiple dynamic road features 26 from numerous vehicles 10. Then, the method 300 proceeds to block 304.

At block 304, the remote server 102 communicates with the dynamic road feature database 303 to check whether there is agreement between the dynamic road feature 26 (e.g., variable speed limit sign) detected via the sensors 24 of the vehicles 10 and the information in the dynamic road feature database 303. Accordingly, at block 202, the remote server 102 retrieves the data from the dynamic road feature database 203 that pertains to the dynamic road feature 26 detected via the sensor 24 of the vehicle 10. Next, the method 300 proceeds to block 306.

At block 306, the remote server 102 determines whether the dynamic road feature database 303 already includes data about the existence of the dynamic road feature 26 previously detected by the sensors 24 (e.g., front-facing camera 25) of the vehicles 10. If the dynamic road feature database 303 of the remote server 102 does not include the data about the existence of the dynamic road feature 26 previously detected by the sensors 24 of the vehicles 10, the method 300 proceeds to block 308.

At block 308, the vehicle controller 34 builds confidence and then uploads the feature data pertaining to the dynamic road feature 26 detected by the sensors 24 of the vehicles 10 to the dynamic road feature database 303. The feature data includes information about the existence, location, type, and/or content of the dynamic road feature 26. In the present disclosure, building confidence means determining the confidence levels of the feature data received from the vehicles 10 and then uploading the aggregated feature data from the vehicles 10 if the confidence levels is above a certain thresholds. To build confidence, the remote server 102 determines whether the number of times the dynamic road feature 26 (e.g., traffic sign) has been detected by the vehicles 10 is greater than minimum number threshold. The remote server 102 also determines whether the percentage of times that the dynamic road feature 26 has been identified as having the same type (e.g., static or dynamic) is greater than a predetermined type-threshold. Moreover, the remote server determines whether the percentage of times that the dynamic road feature 26 has been identified as having the same content (e.g., speed limit value) is greater than the predetermined content-threshold. The remote server 102 uploads the feature data about the dynamic road feature 26 to the dynamic road feature database 303 if and only if: (a) and the number of times the dynamic road feature 26 (e.g., traffic sign) has been detected by the vehicles 10 is greater than minimum number threshold; (b) the percentage of times that the dynamic road feature 26 has been identified as having the same type (e.g., static or dynamic) is greater than a predetermined type-threshold; and (c) the percentage of times that the dynamic road feature 26 has been identified as having the same content (e.g., speed limit value) is greater than the predetermined content-threshold. Otherwise, the remote server 102 keeps aggregating feature data from the vehicles 10.

If the dynamic road feature database 303 of the remote server 102 includes the data about the existence of the dynamic road feature 26 previously detected by the sensors 24 of the vehicles 10 at block 306, the method 300 proceeds to block 310. At block 310, the remote server 102 determines the type of the dynamic road feature 26 using the sensor data from the vehicles 10. For example, the vehicle controller 34 may determine whether the road feature is truly a dynamic (e.g., changes over time) or static road feature. A static road feature does not change over time. Further, at block 310, the remote server 102 determines whether there is agreement about the type of the dynamic road feature 26 between the feature data in the dynamic road feature database 303 and the sensor data collected from the vehicles 10. If the remote server 102 determines that there is no agreement about the type of the dynamic road feature 26 between the feature data in the dynamic road feature database 303 and the sensor data, then the method 300 proceeds to block 312.

At block 312, the remote server 102 executes a conflict resolution algorithm for the type of the dynamic road feature 26 to resolve the conflict between the sensor data collected by the vehicles 10 and the feature data in the dynamic road feature database 303. After block 312, the method 300 continues to block 314. As a non-limiting example of conflict resolution, the remote server 102 may execute a majority voting algorithm. The majority voting algorithm includes the following steps: (a) create a voting table to indicate the type of the dynamic road feature 26 detected by the vehicles; (b) use the vehicle reports to update the voting table; and (c) from the voting table use the column with maximum counts as the type of the dynamic road feature 26 and filter out incorrect (minority) reports. At block 314, the remote server 102 updates the feature data in the dynamic road feature database 303 and reports the updated data to the vehicles 10.

If the remote server 102 determines that there is agreement about the type of the dynamic road feature 26 between the feature data in the dynamic road feature database 303 and the sensor data collected by the vehicles 10, then the method 300 proceeds to block 316. At block 316, the remote server 102 determines whether there is agreement about the content (e.g., speed limit value of a variable speed sign) of the dynamic road feature 26 between the feature data in the dynamic road feature database 303 and the sensor data collected by the vehicles 10. If there is disagreement about the content of the dynamic road feature 26 between the feature data in the dynamic road feature database 303 and the sensor data, then the method 300 continues to block 318.

At block 318, the remote server 102 executes a conflict resolution algorithm to resolve the disagreement about the content (e.g., speed limit value of a variable speed sign) of the dynamic road feature 26 between the feature data in the dynamic road feature database 303 and the sensor data collected by the vehicles 10. In an embodiment of the present disclosure, this conflict resolution algorithm includes the following steps. First, the remote server 102 identifies the coordinated and uncoordinated segments of the road in terms of the content of the dynamic road feature 26 (e.g., speed limit value of a variable speed sign). For example, the remote server 102 may determine which route segments in a predetermined route have the same speed limit based on an identified variable speed sign. Then, the remote server 102 whether the content of the dynamic road feature 26 changes in the coordinated route segment based on the time of the day. For instance, the remote server 102 determines whether there are speed limit changes in a coordinated route segment based on the time of the day. Next, the remote server 102 uses the coordinated speed changes to resolve conflicts between the feature data in the dynamic road feature database 303 and the sensor data collected by the vehicles 10 about the content (e.g., speed limit value of a variable speed sign) of the dynamic road feature 26.

In another embodiment, the conflict resolution algorithm includes the following steps. First at block 317, the remote server 102 retrieves mobility data. The mobility data includes crowdsourced vehicle speed traces from multiple vehicles 10 along a route. The vehicle speed traces may originate from high-speed vehicle telemetry data. Also, for un-coordinated segments, use a previously determined time-of-the-day/speed-limit (voting table) pattern to identify and resolve conflict. For example, in segment 1, between 9:00 am to 10:00 am, 100 vehicles observe 70 mph, and 1 vehicle reports 50 mph, then 100 vehicles vote out the 1 vehicle. Then, at block 318, the remote server 102 determines (e.g., calculates) the mean vehicle speed along the route. Next, the remote server 102 determines whether the percentage of the vehicles 10 reporting the new speed limit value of a variable speed limit sign is equal to or greater than a predetermined minimum count threshold. In this case, the new speed limit value is the speed limit value determined using the sensor data collected by the vehicles 10. Also, the remote server 102 determines whether the percentage of the vehicles 10 reporting the new speed limit value of a variable speed limit sign is equal to or less than a maximum count threshold. Further, the remote server 102 determines whether the mean vehicle speed trace in the route falls within a predetermined speed range. Moreover, the remote server 102 determines whether the new speed is equal to the speed limit value reported by Infrastructure Owner-Operators (IOO) and/or a government agency, such as a department of transportation. The remote server 102 determines that the speed limit value collected from the vehicles 10 is the correct value if and only if: (a) the percentage of the vehicles 10 reporting the new speed limit value of the variable speed limit sign is equal to or greater than the predetermined minimum count threshold; (b) the percentage of the vehicles 10 reporting the new speed limit value of the variable speed limit sign is equal to or less than a maximum count threshold; (c) the mean vehicle speed trace in the route falls within the predetermined speed range; and (d) the new speed is equal to the speed limit value reported by Infrastructure Owner-Operators (IOO) and/or a government agency, such as a department of transportation. Otherwise, the remote server 102 uses the old speed limit value (i.e., the speed limit value in the dynamic road feature database 303.

A conflict resolution algorithm for dynamic changes in speed limit may include the following steps for variable speed limit signs. First, the remote server 102 identifies the predicted current speed limit for a route segment. Then, the route segment uses a voting algorithm to get a conflict count. If the conflict count is greater than a predetermined count threshold, then the remote sever 102 determines that the speed limit in the route segment has potentially changed due to due to incident or road or weather condition, or another reason. The remote server 102 uses the coordinated speed changes to resolve conflicts. After block 318, the method 300 continues to block 314.

If there is agreement about the content of the dynamic road feature 26 between the feature data in the dynamic road feature database 303 and the sensor data, then the method 300 continues to block 320. At block 320, the remote server 102 identifies identifying a start point and an end point of the dynamic road feature 26 (e.g., a variable speed limit sign or other traffic sign). To do so, the remote server 102 identifies one or more road segment for the dynamic road feature 26 (e.g., a traffic sign). The road segment may include a start location and an end location in the route. Here, the remote server 102 may create a voting table of a road. Then, the remote server 102 may use the vehicle reports to update the table. Next, the remote server 102 identifies a corridor. In the present disclosure, the term "corridor" means consecutive road segments with the same speed limit or other consistent traffic rule. The remote server 102 then uses the corridor speed limits to identify the start point and the end point of the dynamic road feature database 303. The start point and an end point of corridor are identified as the start point and the end point of the dynamic road feature 26 (e.g., variable speed sign). The start and end points of the dynamic road feature are then uploaded to the dynamic road feature database 303. After block 320, the method 300 proceeds to block 322.

At block 322, the remote server 102 determines a temporal schedule of the dynamic road feature. The temporal schedule is indicative of a changes in the dynamic road feature 26 with respect to time and may be referred to as a "time of day" plan. For a variable speed limit sign, the temporal schedule may be referred to as a time-of-day speed limit plan. Due to sensor errors, the vehicles 10 may report incorrect speed limit detection data. To address this problem, the remote server 102 uses a majority voting algorithm to filter out incorrect vehicle reports and identify the majority-voted speed limit for a given time slot. To do so, the remote server 102 creates a voting table of time slots. The columns of the table indicate the speed limit values as reported by the vehicles 10, and the rows of the table indicate different time slots as recorded by the vehicles 10. Then, the remote server 102 uses the vehicle reports to update the table. The cells of the table indicate the number of times that the vehicles 10 report a specific speed limit value at each of the time slots. The remote server 102 then finds the column with maximum count of vehicle reports for each time slot. The column of each time slot with the greatest number of vehicle reports is labeled as the correct speed limit value for that time slot. Then, the method 300 continues to block 314. At block 314, the correct speed limit value for each of the time slots is uploaded to the dynamic road feature database 303.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve de sired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for crowdsourced detection of a dynamic road feature, comprising:
   detecting the dynamic road feature using a sensor of a vehicle;
   communicating with a dynamic road feature database of a remote server;
   in response to detecting the dynamic road feature, uploading a feature data to the dynamic road feature database of the remote server, wherein the feature data includes information about the road dynamic feature previously detected by the sensor of the vehicle;
   executing, by the remote server, a conflict resolution algorithm to determine a type of the dynamic road feature, wherein the algorithm comprises:
      creating a voting table to indicate the type of the dynamic road feature detected by vehicles;
      updating the voting table using vehicle reports based on time of day and speed limit; and
      selecting the type with a maximum count and filtering out minority reports;
   identifying, by the remote server, coordinated and uncoordinated segments of the road in terms of the content of the dynamic road feature; and
   controlling a movement of the vehicle using the feature data.

2. The method of claim 1, further comprising:
   determining whether the dynamic road feature database already includes data about an existence of the dynamic road feature previously detected by the sensor of the vehicle; and
   in response to determining that the dynamic road feature database does not include the data about the existence of the dynamic road feature previously detected by the sensor of the vehicle, designating the dynamic road feature previously detected by the sensor of the vehicle as a new feature in the dynamic road feature database.

3. The method of claim 2, wherein the feature data includes information about a type of the dynamic road feature, the sensor of the vehicle generates sensor data, and the method further comprises:
   determining a type of the dynamic road feature using the sensor data;
   determining whether there is agreement about the type of the dynamic road feature between the feature data in the dynamic road feature database and the sensor data in response to determining that the dynamic road feature database already includes the data about the existence of the dynamic road feature previously detected by the sensor of the vehicle; and
   reporting a disagreement about the type of the dynamic road feature between the sensor data and the feature data to the dynamic road feature database in response to determining that there is no agreement about the type of the dynamic road feature between the feature data in the dynamic road feature database and the sensor data.

4. The method of claim 3, further comprising:
   determining a content of the dynamic road feature using the sensor data;
   determining whether there is agreement about the content of the dynamic road feature between the feature data in the dynamic road feature database and the sensor data in response to determining that the dynamic road feature database already includes the data about the existence of the dynamic road feature previously detected by the sensor of the vehicle; and
   reporting a disagreement about the content of the dynamic road feature between the sensor data and the feature data to the dynamic road feature database in response to determining that there is no agreement between the feature data in the dynamic road feature database and the sensor data about the content of the dynamic road feature.

5. The method of claim 4, further comprising identifying a start point and an end point of the dynamic road feature.

6. The method of claim 5, further comprising determining a temporal schedule of the dynamic road feature, wherein the temporal schedule is indicative of a changes in the dynamic road feature with respect to time.

7. The method of claim 6, wherein the dynamic road feature is a variable speed limit sign.

8. A system for crowdsourced detection of dynamic road features, comprising:
   a sensor; and
   a vehicle controller in communication with the sensor, wherein the vehicle controller is programmed to:
      detect a dynamic road feature using the sensor of a vehicle;
      communicate with a dynamic road feature database of a remote server;
      in response to detecting the dynamic road feature, upload a feature data to the dynamic road feature database of the remote server, wherein the feature data includes information about the road dynamic feature previously detected by the sensor of the vehicle;
      execute, by the remote server, a conflict resolution algorithm to determine a type of the dynamic road feature, wherein the algorithm comprises:
         creating a voting table to indicate the type of the dynamic road feature detected by vehicles;
         updating the voting table using vehicle reports based on time of day and speed limit; and
         selecting the type with a maximum count and filtering out minority reports;
      identify, by the remote server, coordinated and uncoordinated segments of the road in terms of the content of the dynamic road feature; and
      control a movement of the vehicle using the feature data.

9. The system of claim 8, wherein the vehicle controller is programmed to:
   determine whether the dynamic road feature database already includes data about an existence of the dynamic road feature previously detected by the sensor of the vehicle; and
   in response to determining that the dynamic road feature database does not include the data about the existence of the dynamic road feature previously detected by the sensor of the vehicle, designate the dynamic road feature previously detected by the sensor of the vehicle as a new feature in the dynamic road feature database.

10. The system of claim 9, wherein the feature data includes information about a type of the dynamic road feature, the sensor of the vehicle generates sensor data, and the vehicle controller is programmed to:
   determine a type of the dynamic road feature using the sensor data;
   determine whether there is agreement between the feature data in the dynamic road feature database and the sensor data about the type of the dynamic road feature in response to determining that the dynamic road feature database already includes the data about the existence of the dynamic road feature previously detected by the sensor of the vehicle; and
   report a disagreement about the type of the dynamic road feature between the sensor data and the feature data to the dynamic road feature database in response to determining that there is no agreement between the feature data in the dynamic road feature database and the sensor data about the type of the dynamic road feature.

11. The system of claim 10, wherein the vehicle controller is programmed to:
   determine a content of the dynamic road feature using the sensor data;
   determine whether there is agreement between the feature data in the dynamic road feature database and the sensor data about the content of the dynamic road feature in response to determining that the dynamic road feature database already includes the data about the existence of the dynamic road feature previously detected by the sensor of the vehicle; and
   report a disagreement about the content of the dynamic road feature between the sensor data and the feature data to the dynamic road feature database in response to determining that there is no agreement between the feature data in the dynamic road feature database and the sensor data about the content of the dynamic road feature.

12. The system of claim 11, wherein the vehicle controller is programmed to identify a start point and an end point of the dynamic road feature.

13. The system of claim 12, wherein the vehicle controller is programmed to determine a temporal schedule of the dynamic road feature, wherein the temporal schedule is indicative of a changes in the dynamic road feature with respect to time.

14. The system of claim 13, wherein the dynamic road feature is a variable speed limit sign.

15. A non-transitory machine-readable medium, comprising machine-readable instructions, that when executed by a processor, cause the processor to:
   detect a dynamic road feature using a sensor of a vehicle;
   communicate with a dynamic road feature database of a remote server;
   in response to detecting the dynamic road feature, upload a feature data to the dynamic road feature database of the remote server, wherein the feature data includes information about the road dynamic feature previously detected by the sensor of the vehicle;
   detect a dynamic road feature using the sensor of a vehicle;
   communicate with a dynamic road feature database of a remote server;
   in response to detecting the dynamic road feature, upload a feature data to the dynamic road feature database of the remote server, wherein the feature data includes information about the road dynamic feature previously detected by the sensor of the vehicle;
   execute, by the remote server, a conflict resolution algorithm to determine a type of the dynamic road feature, wherein the algorithm comprises:
      creating a voting table to indicate the type of the dynamic road feature detected by vehicles;
      updating the voting table using vehicle reports based on time of day and speed limit; and
      selecting the type with a maximum count and filtering out minority reports;
   identify, by the remote server, coordinated and uncoordinated segments of the road in terms of the content of the dynamic road feature; and
   control a movement of the vehicle using the feature data.

16. The non-transitory machine-readable medium of claim 15, wherein the tangible, non-transitory, machine-readable medium further comprising machine-readable instructions, that when executed by the processor, causes the processor:
    determine whether the dynamic road feature database already includes data about an existence of the dynamic road feature previously detected by the sensor of the vehicle; and
    in response to determining that the dynamic road feature database does not include the data about the existence of the dynamic road feature previously detected by the sensor of the vehicle, designate the dynamic road feature previously detected by the sensor of the vehicle as a new feature in the dynamic road feature database.

17. The non-transitory machine-readable medium of claim 16, the feature data includes information about a type of the dynamic road feature, the sensor of the vehicle generates sensor data, and the tangible, non-transitory, machine-readable medium further comprising machine-readable instructions, that when executed by the processor, causes the processor:
    determine a type of the dynamic road feature using the sensor data;
    determine whether there is agreement between the feature data in the dynamic road feature database and the sensor data about the type of the dynamic road feature in response to determining that the dynamic road feature database already includes the data about the existence of the dynamic road feature previously detected by the sensor of the vehicle; and
    report a disagreement about the type of the dynamic road feature between the sensor data and the feature data to the dynamic road feature database in response to determining that there is no agreement between the feature data in the dynamic road feature database and the sensor data about the type of the dynamic road feature.

18. The non-transitory machine-readable medium of claim 17, wherein the tangible, non-transitory, machine-readable medium further comprising machine-readable instructions, that when executed by the processor, causes the processor:
    determine a content of the dynamic road feature using the sensor data;
    determine whether there is agreement between the feature data in the dynamic road feature database and the sensor data about the content of the dynamic road feature in response to determining that the dynamic road feature database already includes the data about the existence of the dynamic road feature previously detected by the sensor of the vehicle; and
    report a disagreement about the content of the dynamic road feature between the sensor data and the feature data to the dynamic road feature database in response to determining that there is no agreement between the feature data in the dynamic road feature database and the sensor data about the content of the dynamic road feature.

19. The non-transitory machine-readable medium of claim 18, wherein the tangible, non-transitory, machine-readable medium further comprising machine-readable instructions, that when executed by the processor, causes the processor to identify a start point and an end point of the dynamic road feature.

20. The non-transitory machine-readable medium of claim 19, wherein the tangible, non-transitory, machine-readable medium further comprising machine-readable instructions, that when executed by the processor, causes the processor to determine a temporal schedule of the dynamic road feature, wherein the temporal schedule is indicative of a changes in the dynamic road feature with respect to time.

* * * * *